US010609272B2

(12) United States Patent
Fu et al.

(10) Patent No.: US 10,609,272 B2
(45) Date of Patent: Mar. 31, 2020

(54) METHOD, DEVICE AND COMPUTER READABLE MEDIUM FOR COMMUNICATION USING SMART VIDEO CAMERAS (71) Applicant: Beijing Xiaomi Mobile Software Co., Ltd., Haidian District, Beijing (CN)

(72) Inventors: Qiang Fu, Beijing (CN); Weiguang Jia, Beijing (CN); Enxing Hou, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 100 days.

(21) Appl. No.: 15/832,459

(22) Filed: Dec. 5, 2017

(65) Prior Publication Data
US 2018/0167546 A1 Jun. 14, 2018

(30) Foreign Application Priority Data
Dec. 14, 2016 (CN) .......................... 2016 1 1152476

(51) Int. Cl.
*H04N 5/232* (2006.01)
*H04L 29/06* (2006.01)
(Continued)

(52) U.S. Cl.
CPC ..... *H04N 5/23206* (2013.01); *H04L 65/1069* (2013.01); *H04L 65/403* (2013.01);
(Continued)

(58) Field of Classification Search
CPC ...... H04N 5/23206; H04N 7/15; H04N 7/147; H04N 7/181; H04L 65/1069; H04L 65/403
See application file for complete search history.

(56) References Cited

U.S. PATENT DOCUMENTS

2009/0016496 A1   1/2009  Bulmer
2012/0174156 A1*  7/2012  Park .................. H04N 5/44543
                                              725/40
2014/0120980 A1   5/2014  Mariatos

FOREIGN PATENT DOCUMENTS

CN    201146572 Y    11/2008
CN    201414195 Y    2/2010
CN    104618440 A    5/2015
(Continued)

OTHER PUBLICATIONS

Johnston et al., "SIP Call Flow Examples, draft-ietf-sip-call-flows-05.txt", Internet Engineering Task Force, Internet Draft, Jun. 2001, 222 pages. (Year: 2001).*

(Continued)

*Primary Examiner* — Nelson D. Hernández Hernández
(74) *Attorney, Agent, or Firm* — Arch & Lake LLP (57) ABSTRACT

The present disclosure provides a method, device and computer readable storage medium for communication based on smart video cameras in the field of communication technology. The method comprises: receiving a communication request from a first smart video camera, wherein the communication request carries a device identification of the first smart video camera; determining the device identification of a second smart video camera bound with the first smart video camera, based on the device identification of the first smart video camera; establishing a communication between the first smart video camera and the second smart video camera based on the device identification of the second smart video camera. In the examples of the present disclosure, the server is able to realize the communication between the first smart video camera and the second smart video camera according to their device identifications. In this way, users are no longer restricted to the communication with the mobile terminal currently logging in to the user account, and (Continued)

the applicable scenario of the communication function of the smart video camera is thus expanded.

12 Claims, 3 Drawing Sheets

(51) Int. Cl.
    *H04N 7/15*     (2006.01)
    *H04N 7/18*     (2006.01)
    *H04L 29/08*     (2006.01)
    *H04W 76/10*     (2018.01)

(52) U.S. Cl.
    CPC .............. *H04L 67/146* (2013.01); *H04N 7/15* (2013.01); *H04N 7/181* (2013.01); *H04L 69/18* (2013.01); *H04W 76/10* (2018.02)

(56) References Cited

FOREIGN PATENT DOCUMENTS

| CN | 204887191 U | 12/2015 |
|---|---|---|
| CN | 105407316 A | 3/2016 |
| CN | 105872439 A | 8/2016 |
| CN | 105898181 A | 8/2016 |

OTHER PUBLICATIONS

Extended European Search Report issued in corresponding European Application No. 17207017.9, dated Feb. 12, 2018, 11 pages.
Johnston et al., "SIP Call Flow Examples; draft-ieft-sip-call-flows-05.txt" Internet Engineering Task Force, Internet Draft, Jun. 2001, 222 pages.
"Review Xiaomi Mijia 360 WiFi IP Camera," Banggood Forum, Sep. 18, 2016, 8 pages. URL: https://forum.banggood.com/forum-topic-212858.html [retrieved on Feb. 1, 2018.
Cai et al., "Session initiation protocol and web services for next generation multimedia applications," IEEE Fourth International Symposium on Multimedia Software Engineering (MSE'02), Dec. 11, 2002, 12 pages.
First office action issued in corresponding in Chinese Application No. 201611152476.2, dated Apr. 3, 2019, 16 pages.

\* cited by examiner

METHOD, DEVICE AND COMPUTER READABLE MEDIUM FOR COMMUNICATION USING SMART VIDEO CAMERAS

CROSS-REFERENCE TO RELATED APPLICATIONS

This application is based upon and claims priority to Chinese Application No. 201611152476.2, filed Dec. 14, 2016, the entire content of which is incorporated herein by reference for all purposes.

TECHNICAL FIELD

The present disclosure pertains to the field of communication technology, and more particularly to a method, device and computer readable storage medium for communication using smart video cameras.

BACKGROUND

With the development of smart home technologies, smart video cameras have been widely used at home and work places. Besides the video recording function of general video cameras, a smart video camera has a built-in WiFi module which is able to connect to a server. And a mobile terminal can also be connected to the server to control the smart video camera via the server.

SUMMARY

The present disclosure provides a method, device and non-transitory computer-readable storage medium for communication based on smart video cameras.

According to a first aspect of the present disclosure, a method for communication based on smart video cameras is provided. The method may include receiving a communication request from a first smart video camera, where the communication request carries a device identification of the first smart video camera; determining a device identification of a second smart video camera bound with the first smart video camera based on the device identification of the first smart video camera; and establishing a communication between the first smart video camera and the second smart video camera based on the device identification of the second smart video camera.

According to a second aspect of the present disclosure, a device for communication based on smart video cameras is provided. The device may include a processor; a non-transitory memory storage storing instructions executed by the processor; where the processor is configured to: receive a communication request from a first smart video camera where the communication request carries a device identification of the first smart video camera; determine a device identification of a second smart video camera bound with the first smart video camera based on the device identification of the first smart video camera; and establish a communication between the first smart video camera and the second smart video camera based on the device identification of the second smart video camera.

According to a third aspect of the present disclosure. A non-transitory computer-readable storage medium is provided. The non-transitory computer-readable storage medium may include instructions stored therein. The instructions, when they are executed by a processor, may cause the processor to perform receiving a communication request sent from a first smart video camera where the communication request carries a device identification of the first smart video camera; determining a device identification of a second smart video camera bound with the first smart video camera based on the device identification of the first smart video camera; and establishing a communication between the first smart video camera and the second smart video camera based on the device identification of the second smart video camera.

It is understandable, that both the foregoing general description and the following detailed description are exemplary only, and do not limit the present disclosure.

BRIEF DESCRIPTION OF THE DRAWINGS

The drawings herein are incorporated in and constitute a part of the specification, showing examples consistent with the present disclosure, and explaining the principles of the present disclosure together with the specification.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various examples of the present disclosure. Also, common but well-understood elements that are useful or necessary in a commercially feasible example are often not depicted in order to facilitate a less obstructed view of these various examples. It will further be appreciated that certain actions and/or steps may be described or depicted in a particular order of occurrence while those skilled in the art will understand that such specificity with respect to sequence is not actually required. It will also be understood that the terms and expressions used herein have the ordinary technical meaning as is accorded to such terms and expressions by persons skilled in the technical field as set forth above, except where different specific meanings have otherwise been set forth herein.

DETAILED DESCRIPTION

Hereinafter, exemplary embodiments will be described in details, and shown in the drawings. In the following description when referring to the drawings, the same numerals in different drawings denote the same or similar elements unless otherwise indicated. The embodiments described in the following exemplary embodiments are not representative of all the embodiments consistent with the present disclosure. Rather, they are merely examples of devices and methods consistent with some aspects of the present disclosure.

The terminology used in the present disclosure is for the purpose of describing exemplary examples only and is not intended to limit the present disclosure. As used in the present disclosure and the appended claims, the singular forms "a," "an" and "the" are intended to include the plural forms as well, unless the context clearly indicates otherwise. It shall also be understood that the terms "or" and "and/or" used herein are intended to signify and include any or all possible combinations of one or more of the associated listed items, unless the context clearly indicates otherwise.

It shall be understood that, although the terms "first," "second," "third," and the like may be used herein to describe various information, the information should not be limited by these terms. These terms are only used to distinguish one category of information from another. For example, without departing from the scope of the present disclosure, first information may be termed as second information; and similarly, second information may also be termed as first information. As used herein, the term "if" may be understood to mean "when" or "upon" or "in response to" depending on the context.

References throughout this specification to "one embodiment," "an embodiment," "exemplary embodiment," or the like in the singular or plural means that one or more particular features, structures, or characteristics described in connection with an example is included in at least one embodiment of the present disclosure. Thus, the appearances of the phrases "in one embodiment," "in an embodiment," "in an exemplary embodiment," or the like in the singular or plural in various places throughout this specification are not necessarily all referring to the same embodiment. Furthermore, the particular features, structures, or characteristics in one or more embodiments may be combined in any suitable manner.

Smart video cameras installed at home, work places and the like are more than normal video cameras which only have recording function, a voice communication module is also built in the smart video camera to realize remote communication but they could also be bound with mobile terminals via user accounts. In this way, users could obtain real time content captured by the smart video camera via mobile terminals anytime and anywhere to monitor the place covered by the smart video camera. However, the increasing users of smart video cameras are expecting more functions of smart video cameras than the monitoring function.

A voice communication module may be built in the smart video camera to achieve remote communication. A smart video camera and mobile terminal could be bound with a user account. When the smart video camera sends communication requests to server, the server can establish communication between the smart video camera and the mobile terminal based on the requests.

For example, if user A has a smart video camera installed at home as well as in the office, when he/she is in the office, he/she may wish to call the smart video camera at home via the one in the office to communicate with user B at home.

Sometimes, if user A has a smart video camera 1 installed at home, and user B and user C have a smart video camera 2 installed at home, when user A is at home, he/she may wish to call the smart video camera 2 at home of user B and user C via the smart video camera 1 from his/her home to communicate with user B and user C.

Sometimes, if user B is out of home with a mobile terminal bound with smart video camera 2, and user A and user C are at their homes, when user A calls smart video camera 2 via smart video camera 1 to communicate with user C, user B out of home may also wish to take part in the communication. In this case, the communication among smart video camera 1, smart video camera 2 and the mobile terminal carried by user B may need to be established to realize the three-party communication of users A, B and C.

The method of communication based on smart video cameras provided by the examples of the present disclosure could be used in above scenario to realize communication between smart video cameras or multi-party communications among smart video cameras and mobile terminals.

The system structure referred in the examples of the present disclosure is introduced as below.

Figure 1A:
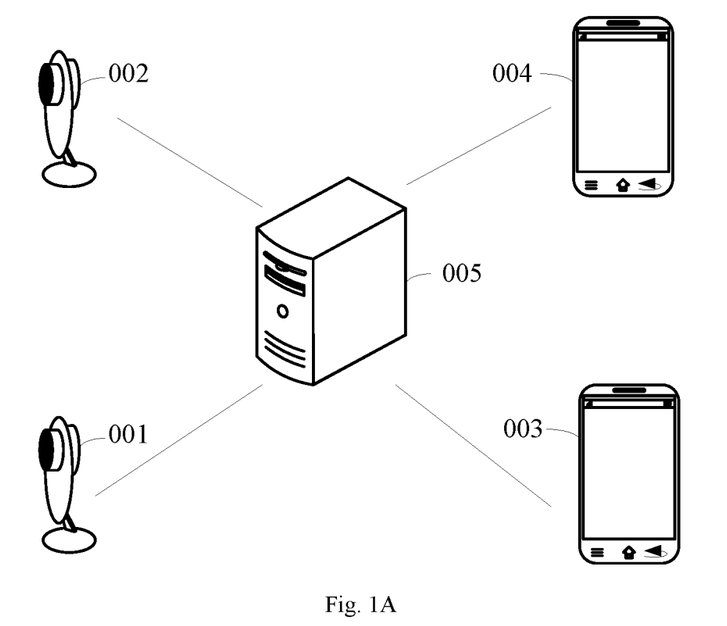
FIG. 1A is a system structure diagram shown according to an example.

FIG. 1A is a system structure diagram of the present disclosure. As is shown in FIG. 1A, the system includes a first smart video camera 001, a second smart video camera 002, a first mobile terminal 003, a second mobile terminal 004 and a server 005. Among them, both the first smart video camera 001 and the second smart video camera 002 could communicate with server 005. The first mobile terminal 003 and the second mobile terminal 004 could also communicate with server 005. The first smart video camera 001 is bound with a first user account, and the first mobile terminal 003 is the mobile terminal currently logging in to the first user account. The second smart video camera 002 is bound with a second user account, and the second mobile terminal 004 is the mobile terminal currently logging in to the second user account. Among them, the first user account and the second user account could be different user accounts of either different applications or the same application.

In the example of the present disclosure, with the first user account logged in, via server 005, the first mobile terminal 003 may control the first smart video camera 001 bound with the first user account; with the second user account logged in, via server 005, the second mobile terminal 004 could control the second smart video camera 002 bound with the second user account. With the method provided by the examples of the present disclosure, server 005 may establish a communication between the first smart video camera 001 and the second smart video camera 002, or a three-party communication may be established among the first smart video camera 001, the second smart video camera 002, and the second mobile terminal 004.

After the three-party communication among the first smart video camera 001, the second smart video camera 002, and second mobile terminal 004 is established, server 005 may also establish a communication between the first smart video camera 001 and the first mobile terminal 003, as well as a communication between first mobile terminal 003 and the second mobile terminal 004 to realize a quartet communication.

Furthermore, when the communication established by server 005 includes the first mobile terminal 003 or the second mobile terminal 004, server 005 may also receive a communication invitation request from the first mobile terminal 003 or the second mobile terminal 004, wherein the communication invitation request carries the user account for the current communication invited by the first mobile terminal 003 or the second mobile terminal 004. Based on the user account, server 005 may invite the mobile terminal or the smart video camera corresponding to the user account to the current communication.

Noticeably, the first mobile terminal 003 and the second mobile terminal 004 can be such mobile terminals as smart cellphones, tablet computers and the like. Server 005 can be an individual server device, and can also be a server cluster including a plurality of server devices.

Sometimes, the smart video camera could send communication requests to the server, and the server could send communication invitation requests to the mobile terminal that is currently logging in to the user account based on the communication requests mentioned above. The communication between the smart video camera and the mobile terminal is established when a communication acceptance response from the mobile terminal is received.

In other words, the smart video camera may only have a two-way communication with the mobile terminal that is currently logging in to the user account, rather than with other smart devices. In practice, as the smart video camera bound with the user account and the mobile terminal currently logging in to the user account belong to the same user, the applicable scenario for the communication of the user via this smart video camera is limited. In other words, the applicable scenario of the communication function of smart video cameras is narrow.

In order to solve the foregoing problem, the examples of the present disclosure provide a method applied to a server for communication based on smart video cameras. In this method, the server is able to establish a communication between the first smart video camera and the second smart video camera according to the device identification of the first smart video camera and the device identification of the second smart video camera bound with the first smart video camera. Thus, the communication between two smart video cameras can be established. In this way, users may no longer be restricted to the communication with the mobile terminal currently logging in to the user account, and the applicable scenario of the communication function of the smart video camera is thus expanded.

Figure 1B:
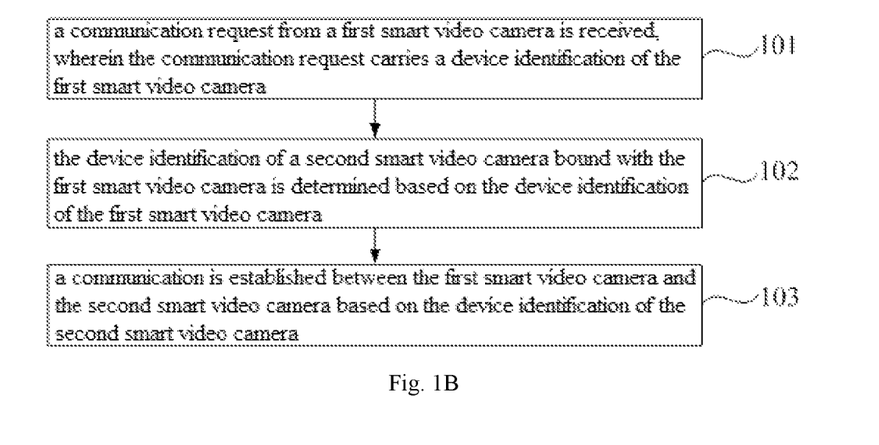
FIG. 1B is a flowchart of a communication method based on smart video cameras shown according to an example.

FIG. 1B is a flowchart of a communication method based on smart video cameras according to an example. As it is shown in FIG. 1B, the method is applied to the server and includes the following steps.

At step 101, a communication request from a first smart video camera is received, where the communication request carries a device identification of the first smart video camera.

At step 102, a device identification of a second smart video camera bound with the first smart video camera is determined based on the device identification of the first smart video camera.

At step 103, a communication is established between the first smart video camera and the second smart video camera based on the device identification of the second smart video camera.

In the examples of the present disclosure, the server is able to establish a communication between the first smart video camera and the second smart video camera according to the device identification of the first smart video camera and the device identification of the second smart video camera bound with the first smart video camera. The communication between two smart video cameras can be established. In this way, users may no longer be restricted to the communication with the mobile terminal currently logging in to the user account, and the applicable scenario of the communication function of the smart video camera is thus expanded.

Optionally, the step of determining the device identification of a second smart video camera bound with the first smart video camera, based on the device identification of the first smart video camera, may also include:

determining the device identification of the second smart video camera bound with the first smart video camera from the saved device binding list, based on the device identification of the first smart video camera.

Optionally, before the device identification of the second smart video camera is determined, based on the device identification of the first smart video camera, the method may further include:

receiving a device binding request sent from the first mobile terminal or the second mobile terminal, the binding request carries the device identifications of the first smart video camera and the second smart video camera, where the first mobile terminal is the mobile terminal currently logging in to a first user account, and the first user account is the user account bound with the first smart video camera, the second mobile terminal is the mobile terminal currently logging in to a second user, and the second user account is the user account bound with the second smart video camera; and saving the device identifications of the first smart video camera and the second smart video camera in the device binding list respectively.

Optionally, establishing the communication between the first smart video camera and the second smart video camera, based on the device identification of the second smart video camera, may include:

sending a communication invitation request to the second smart video camera based on the device identification of the second smart video camera; and establishing a communication between the first smart video camera and second smart video camera when a communication acceptance response from the second smart camera is received.

Optionally, after the communication invitation request is sent to the second smart video camera based on the device identification of the second smart video camera, the method may further include:

sending a communication invitation request to the second mobile terminal, when the communication acceptance response from the second smart video camera is failed to be received within a preset time;

checking whether a control message sent from the second mobile terminal is received, where the control message is used to direct the server to control the second smart video camera to accept the communication invitation request; and controlling the second smart video camera to accept the communication invitation request when the control message is received, to establish a communication between the first smart video camera and the second smart video camera.

Optionally, after the communication invitation request is sent to the second mobile terminal, the method may further include:

establishing a communication between the first smart video camera and the second mobile terminal when the communication acceptance response sent from the second mobile terminal is received.

Optionally, after the communication is established between the first smart video camera and the second mobile terminal, the method may further include:

establishing a communication between the second smart video camera and the second mobile terminal.

Optionally, the method may include: receiving the communication invitation request sent from the first mobile terminal or the second mobile terminal, the communication invitation request carries the user account which is to be invited to the current communication; and inviting the mobile terminal or the smart video camera corresponding to the user account to the current communication based on the user account carried in the communication invitation request.

All of the selectable technique solutions described above, may be selected in any combination to form alternative examples of the present disclosure, and are not described again herein.

Figure 2:
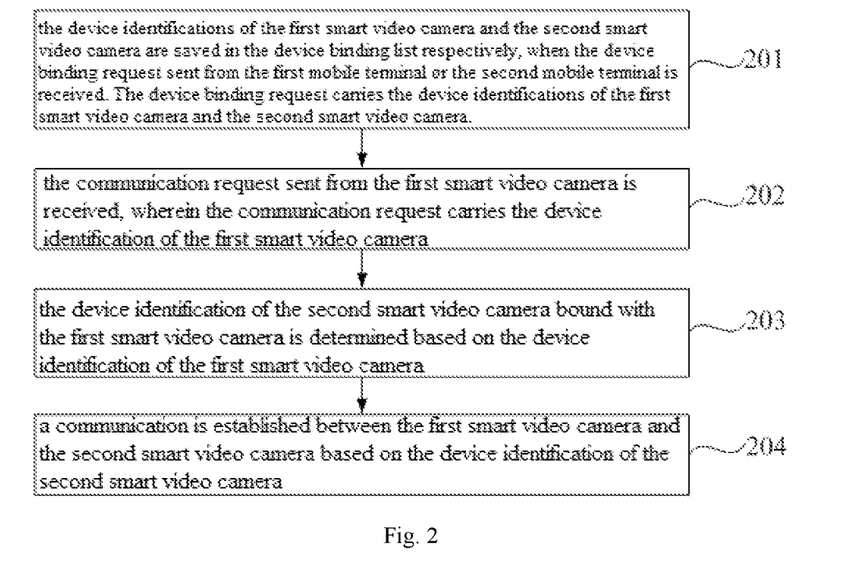
FIG. 2 is a flowchart of a communication method based on smart video cameras shown according to another example.

FIG. 2 is a flowchart of a communication method based on smart video cameras according to another example. As it is shown in FIG. 2, the method is applied to the server and may include the following steps.

At step 201, the device identifications of the first smart video camera and the second smart video camera are saved in the device binding list respectively, when the device binding request sent from the first mobile terminal or the second mobile terminal is received. The device binding request carries the device identifications of the first smart video camera and the second smart video camera.

The first mobile terminal may be the mobile terminal currently logging in to a first user account, and the first user account may be the user account bound with the first smart video camera. The second mobile terminal may be the mobile terminal currently logging in to a second user account, and the second user account may be the user account bound with the second smart video camera.

Smart video cameras arranged at home, work places and the like may be bound with user accounts, and the mobile terminal may log in to a user account through the installed Application (APP) to control and monitor the smart video camera anytime and anywhere.

In the example of the present disclosure, in order to establish the communication between the first smart video camera and the second smart video camera, the first smart video camera is required to be bound with the second smart video camera before the communication is established since the first smart video camera and the second smart video camera are not bound with the same user account.

In accordance with the above description, since the first smart video camera and the second smart video camera are not bound with each other, the first mobile terminal or the second mobile terminal may send the device binding request to the server, when the first mobile terminal logs in to the first user account or when the second mobile terminal logs in to the second user account. The device identifications of the first smart video camera and the second smart video camera in the device binding request could be saved in the device binding list respectively, when the device binding request is received by the server, the binding may be fulfilled between the first smart video camera and the second smart video camera.

The device identification of the first smart video camera may be the device number of the first smart video camera, the Internet Protocol (IP) address or the Media Access Control (MAC) address in correspondence to the first smart video camera or other unique information, by which the first smart video camera can be identified. The device identification of the second smart video camera may be the device number of the second smart video camera, the IP address or the MAC address in correspondence to the second smart video camera or other unique information, by which the second smart video camera can be identified.

After the first smart video camera and the second smart video camera are bound by the server based on the device binding request, the communication between the first smart video camera and the second smart video camera may be established as per the operations mentioned at steps 202 to 204 when the communication request from the first smart video camera is received.

The communication between the second smart video camera and the first smart video camera may also be established according to the method provided at steps 202 to 204 when the communication request sent from the second smart video camera is received.

Taking the communication invitation request sent from the first smart video camera as an example, examples of the present disclosure introduce the implementation process of establishing the communication between the first smart video camera and the second smart video camera by the server.

When the first smart video camera and the second smart video camera have been bound with each other, the server can establish a communication between first smart video camera and the second smart video camera through operations at steps 202-204 when the communication invitation request sent from the first smart video camera is received. Then, performing step 201 may not be needed.

At step 202, the communication request sent from the first smart video camera is received where the communication request carries the device identification of the first smart video camera.

Generally, some smart video cameras could be arranged with a physical communication button, or could include touch screens, on which a communication option could be displayed. When the user needs a communication via the smart video camera, it can be implemented by pushing the communication button on the smart video camera or selecting the communication option on the smart video camera. The push of the communication button or the selection of the communication option may be used for triggering the communication instruction in the smart video camera.

Therefore, the first smart video camera could send a communication request to the server when such communication operation is detected. In order to determine the first smart video camera which sends the communication request by the server, and to determine the second smart video camera via the first smart video camera, the communication request may be allowed to carry the device identification of the first smart video camera.

In addition, as smart video cameras may also capture videos, the communication request could be either a voice communication request or a video communication request.

At step 203, the device identification of the second smart video camera bound with the first smart video camera is determined based on the device identification of the first smart video camera.

According to the description at step 201, the device binding list is saved in the server, and the device identification of the first smart video camera and the device identification of the second smart video camera bound with the first smart video camera are saved in the device binding list respectively. Therefore, when receiving the communication request sent from the first smart video camera, the server is able to determine the device identification of the second smart video camera bound with the first smart video camera using the saved device binding list. The determination may be made based on the device identification of the first smart video camera carried in the communication request so that the communication between the first smart video camera and the second smart video camera can be established by the server according to the step 204.

At step 204, a communication is established between the first smart video camera and the second smart video camera based on the device identification of the second smart video camera.

After the device identification of the second smart video camera bound with the first smart video camera is determined by the server, the following operations may be carried out to establish a communication between the first smart video camera and the second smart video camera based on the device identification of the second smart video camera. A communication invitation request may be sent to the second smart video camera based on its device identification to establish a communication between the first smart video camera and the second smart video camera when a communication acceptance response from the second smart video camera is received.

The server may send the communication invitation request to the second smart video camera based on its identification. The second smart video camera may remind users in ways of ringing and the like. When the communication invitation request is received, and after being reminded, users could push the answer button on the second smart video camera or select the answer option to accept communication invitation requests. When the answering operation of the user is detected by the second smart video camera, the communication acceptance response could be sent to the server. The server then may establish a communication between first smart video camera and the second smart video camera when the communication acceptance response is received. At this time, the first smart video camera is allowed to communicate with the second smart video camera via the server.

Alternatively, in some cases, it may not be convenient for users of the second smart video camera to carry out answering operations on the second smart video camera when the communication invitation request is received by the second smart video camera. In this case, in order to prevent the users of the second smart video camera from missing the communication, the server may establish a communication between the first smart video camera and the second smart video camera as follows. The server may send the communication invitation request to second mobile terminal when the communication acceptance response from the second smart video camera is not received within a preset time. The server may check whether a control message sent from the second mobile terminal is received where the control message is used to direct the server to control the second smart video camera to accept the communication invitation request. The server may control the second smart video camera to accept the communication invitation request when the control message is received. Thus, the server may establish a communication between the first smart video camera and the second smart video camera.

When the communication acceptance response sent from the second smart video camera is failed to be received by the server within the preset time, it may be determined that it is inconvenient for the users of the second smart video camera to carry out answering operations at present. Moreover, users may often carry mobile terminals along with them and may be able to log in to their user accounts using the mobile terminal to control the smart video camera.

Accordingly, under such circumstances, the server may determine the second user account based on the device identification of the second smart video camera and send the communication invitation request to the second mobile terminal currently logged in to the second user account. The communication invitation request may be displayed on the second mobile terminal and the users of the second mobile terminal may be reminded by ringing, vibrating and other ways.

When the communication invitation request is received by the second mobile terminal after being reminded, users of the second mobile terminal may send the control message to the server via the APP installed in the second mobile terminal. The server may control the second smart video camera to accept the communication invitation request when the control message is received. The server may establish the communication between the first smart video camera and the second smart video camera.

Furthermore, in order to expand the applicable scenario of the communication function of the smart video camera and break the limitation of the communication between two smart video cameras and provide more options for the users, the server may check whether the communication acceptance response sent from the second mobile terminal is received while checking whether the control message from the second mobile terminal is received.

When the server receives only the communication acceptance response from the second mobile terminal and fails to receive the control message, the communication between the first smart video camera and the second mobile terminal may be established. When server receives both the communication acceptance response from the second mobile terminal and the control message, the communication among the first smart video camera, the second smart video camera and the second mobile terminal may be established.

Further, when the communication among the first smart video camera, the second smart video camera and the second mobile terminal is established, the server can also receive the request information to take part in the communication sent from the first mobile terminal and establish a quartic communication among the first mobile terminal, the first smart video camera, the second smart video camera and the second mobile terminal.

Therefore, when the smart video camera is used by the users for communication, the communication could be established not only between the smart video camera and the mobile terminal but also between two smart video cameras. The multi-party communication among two smart video cameras and one or two mobile terminals may also be carried out, and the applicable scenario of the communication function of the smart video camera is further expanded.

Optionally, the first mobile terminal or the second mobile terminal can further invite other mobile terminals and/or smart video cameras to the current communication. Under such circumstances, the server may receive the communication invitation request sent from the first mobile terminal or the second mobile terminal. The communication invitation request carries the user account which is to be invited to the current communication. The server may invite the mobile terminal or the smart video camera corresponding to the user account to the current communication based on the user account carried in the communication invitation request. Thus, the number of communication parties is further increased.

In some applications, the device identification of the second smart video camera may be stored in the first smart video camera and the device identification of the first smart video camera may be stored in the second smart video camera. For example, after first smart video camera and the second smart video camera establish a communication, the first smart video camera and the second smart video camera may be able to communicate with each other. As such, in order for the future use, the device identification of the second smart video camera may be stored in the first smart video camera and the device identification of the first smart video camera may be stored in the second smart video camera.

In some applications, the device binding list may be saved on an individual smart video camera. As described above, the device identification of the second smart video camera may be stored in the first smart video camera and the device identification of the first smart video camera may be stored in the second smart video camera. Thus, when a communication request is sent from the first smart video camera, the first smart video camera may retrieve the device identification of the second smart video camera locally and include the device identification of the second smart video camera in the communication request. When the second smart video camera receives a communication request, the second smart video camera may extract the device identification of the second smart video camera from the communication request and verify the ability to communicate with the first smart video camera by checking the device identification of the first smart video camera that is in the stored device binding list locally.

In some applications, a voice recognition device may be built into the smart video camera. For example, when the second smart video camera receives a communication request from the first smart video camera, and after verifying that the first smart video camera and the second smart video camera can communicate, the second smart video camera may generate a voice reminder to remind the user of the second smart video camera to answer. When the user of the second smart video camera is busy, for example, he or she is in the middle of cooking, the second smart video camera may accept a voice from the user of the second smart video camera through the built-in voice recognition device. The accepted voice may be analyzed to determine whether the user would like to take the incoming communication request from the first smart video camera or not. If yes, the communication may be established and the user may talk via the established communication between the first smart video camera and the smart video camera with another user on the other end.

Figure 3:
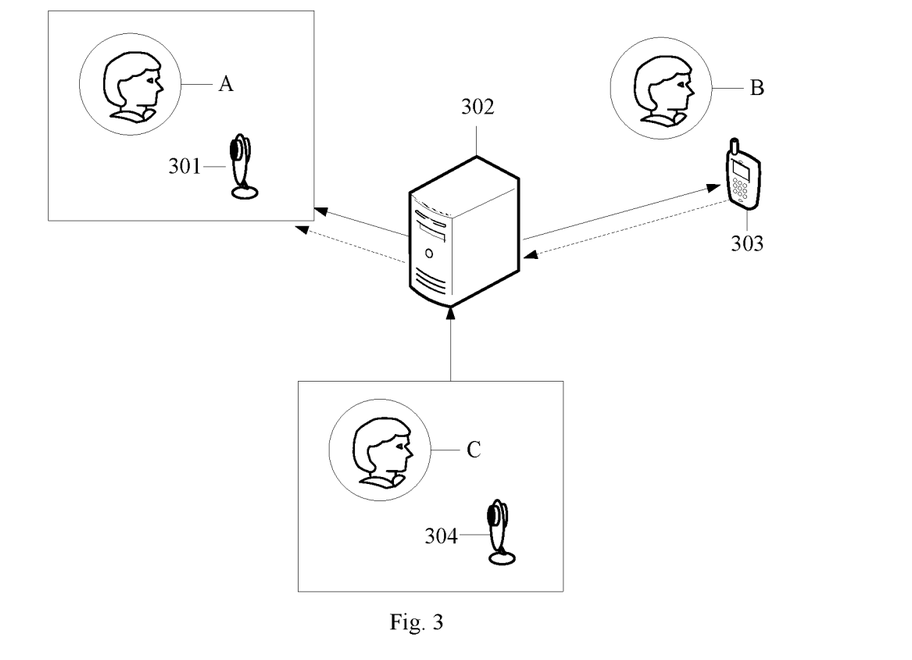
FIG. 3 is a system diagram of use case of a communication based on smart video cameras shown according to an example.

FIG. 3 is a system diagram of the communication based on smart video cameras according to the present disclosure. As it is shown in FIG. 3, the second smart video camera 301 is installed at home. When the communication invitation request is received by the second smart video camera 301, user A at home is cooking and may be inconvenient to carry out the answering operation on the second smart video camera 301. However, since the communication acceptance response from the second smart video camera 301 is failed to be received after the communication invitation request is sent from the server 302 within a preset time, thirty (30) seconds for example, the communication invitation request could be sent to the second mobile terminal 303 currently logging in to the second user account.

In case the owner of the second mobile terminal 303 is user B, who is not currently at home, the user B may be able to send the control message to the server through the APP installed in the second mobile terminal and enable the server 302 to control the second smart video camera 301 to accept the communication invitation request.

In this way, user A at home could communicate with user C of the first smart video camera directly even though user A may not perform the answering operation for the second video camera.

In case user B also wants to take part in the communication between user A at home and the user C of the first smart video camera 304, user B at home could send a communication acceptance response to server 302 via the APP installed in the second mobile terminal 303, and the communication among the first smart video camera 304, the smart second video camera 301 and the second mobile terminal 303 could be established after the communication acceptance response is received by the server 302. Thus, the three-party communication can be achieved.

In the present disclosed example, the server is able to establish a communication between the first smart video camera and the second smart video camera based on the device identification of the first smart video camera and the device identification of the second smart video camera bound with the first smart video camera. In this way, users are no longer restricted to communication with the mobile terminal currently logging in to the user account, users may also have a direct communication with the other users via their smart video cameras. Therefore, the application range of the communication function of the smart video camera is expanded.

On the other hand, when the second smart video camera fails to accept the communication invitation request within a preset time period, the server is also allowed to control the second smart video camera to accept the communication invitation request via the control message sent from the mobile terminal currently logged in to the user account. As such, users may be prevented from missing the communication. It may also be convenient for the users to satisfy the request. Moreover, the server is able to receive the communication acceptance response from the second mobile terminal while receiving the control message sent from the second mobile terminal to establish a three-party communication among the first smart video camera, the second smart video camera and the second mobile terminal. As a result, the applicable scenario of the communication function of the smart video camera is further expanded.

The examples of the present disclosure also provide a device for communication based on smart video cameras and a method capable of implementing the communication. The device includes a processor, and a non-transitory computer-readable storage medium storing instructions that can be executed by a processor. The processor may be configured to: receive the communication request sent from the smart first video camera, where the communication request carries the device identification of the first smart video camera; determine the device identification of the second smart video camera bound with the first smart video camera based on the device identification of the first smart video camera; and establish a communication between the first smart video camera and the second smart video camera based on the device identification of the second smart video camera.

Optionally, the processor may be configured to: a determining sub-module for determining the device identification of the second smart video camera bound with the first smart video camera from the saved device binding list, based on the device identification of the first smart video camera.

Alternatively, the processor may be configured to: receive the device binding request sent from the first mobile terminal or the second mobile terminal, where the device binding request carries the device identifications of the first smart video camera and the second smart video camera, wherein the first mobile terminal is the mobile terminal currently logged in to the first user account, and the first user account is the user account bound with the first smart video camera, and the second mobile terminal is the mobile terminal currently logged in to the second the user account, and the second user account is the user account bound with the second smart video camera; and save the device identifications of the first smart video camera and the second smart video camera in the device binding list respectively.

Optionally, the processor may be configured to: send the communication invitation request to the second smart video camera based on the device identification of second smart video camera, and establish a communication between the first smart video camera and the second smart video camera when the communication acceptance response sent from the second smart video camera is received.

Optionally, the processor may be configured to: send the communication invitation request to the second mobile terminal when the communication acceptance response from the second smart video camera is not received within the preset time; check whether the control message sent from the second mobile terminal is received, wherein the control message is used to direct the server to control the second smart video camera to accept the communication invitation request; and control the second smart video camera to accept the communication invitation request when the control message is received, to establish a communication between the first smart video camera and the second smart video camera.

Optionally, the processor may be configured to: establish the communication between the first smart video camera and the second mobile terminal when the communication acceptance response sent from the second mobile terminal is received.

Optionally, the processor may be configured to: establish a communication between the second smart video camera and the second mobile terminal.

Optionally, the processor may be configured to: receive the communication invitation request sent from the first mobile terminal or the second mobile terminal, the communication invitation request carries the user account which is to be invited to the current communication; and invite the mobile terminal or the smart video camera corresponding to the user account to the current communication, based on the user account carried in the communication invitation request. In the present disclosed example, the server is able to establish a communication between the first smart video camera and the second smart video camera based on the device identification of the first smart video camera and the device identification of the second smart video camera bound with the first smart video camera. Thus, the communication between two smart video cameras can be achieved. In this way, users are no longer restricted to communication with the mobile terminal currently logging in to the user account. Also, users may have a direct communication with the other users via their smart video cameras. Therefore, the applicable scenario of the communication function of the smart video camera is expanded.

On the other hand, when the second smart video camera fails to accept the communication invitation request in time, the server may be also allowed to control the second smart video camera to accept the communication invitation request via the control message sent from the mobile terminal currently logging in to the user account. As such, users may be prevented from missing the communication and to bring them convenience. Moreover, the server is able to receive the communication acceptance response from the second mobile terminal while receiving the control message sent from the second mobile terminal to establish a three-party communication among the first smart video camera, the second smart video camera and the second mobile terminal. As such, the applicable scenario of the communication function of the smart video camera is further expanded.

With respect of the device of the above example, the specific method of operation performed by each module has been described in detail in the example of the method. The descriptions thereof are not provided repeatedly in detail herein.

Figure 4:
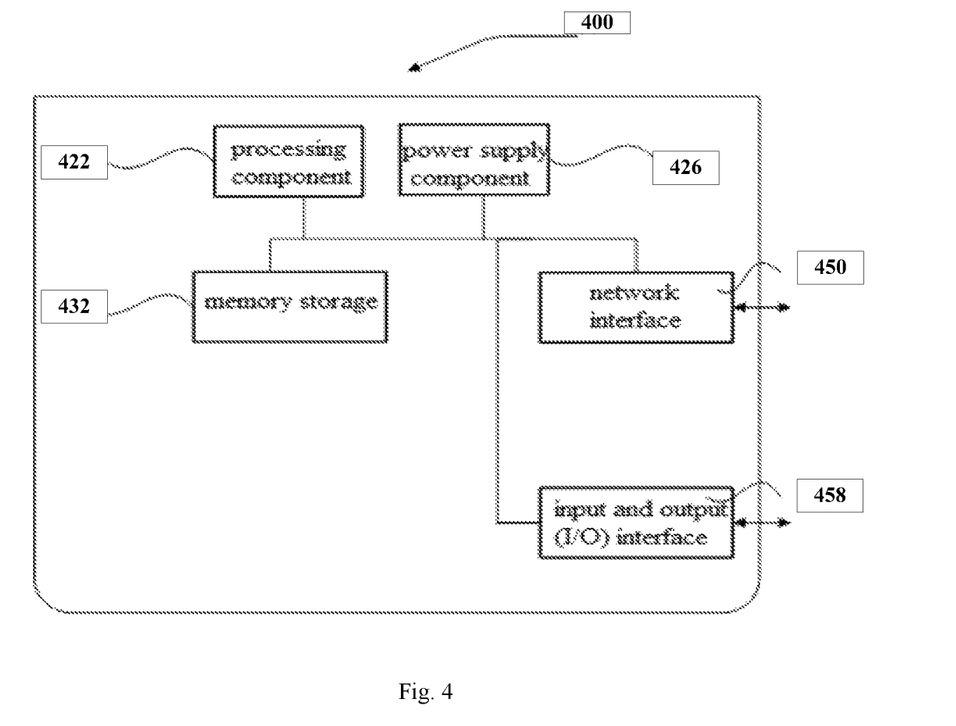
FIG. 4 is a block diagram of a device for communication based on smart video cameras shown according to an example.

FIG. 4 is a block diagram of a device 400 for communication based on smart video cameras according to an example. For example, the device 400 may be provided as a server. As it is shown in FIG. 4, the device 400 includes a processing component 422, which further consists of one or more processors, and a memory resource. The memory resource, which is represented by memory storage 432, may be used to save the instructions, such as applications, which can be executed by the processing component 422. The applications saved in the memory storage 432 may include one or more than one modules, which are in correspondence with a set of instructions. Moreover, the processing component 422 may be configured to execute instructions, so as to execute the method for communication based on smart video cameras provided in the above example.

Device 400 may also include a power supply component 426, which may be configured to manage the power supply of device 400, a wired or wireless network interface 450, which may be configured to connect the device 400 to network, and an input and output (I/O) interface 458. Device 400 is capable of operating operating systems saved in the memory storage 532 such as Windows Server™, Mac OS X™, Unix™, Linux™ and FreeBSD™, or the like.

In an example, there is further provided a non-transitory computer-readable storage medium containing the memory storage 432 including instructions that can be executed by the processor 422 of the device 400 to perform the method described above. For example, the non-transitory computer-readable storage medium may include ROMs, random access memories (RAMs), CD-ROMs, magnetic tapes, floppy disks, and optical data storage devices.

A non-transitory computer-readable storage medium may enable the server to perform a method for communication based on a smart video camera when the instruction stored in the non-transitory computer-readable storage medium is executed by the processor of the server.

The method may include: receiving a communication request from the first smart video camera, and the communication request carries the device identification of the first smart video camera; determining the device identification of the second smart video camera bound with the first smart video camera based on the device identification of the first smart video camera; and establishing a communication between the first smart video camera and the second smart video camera based on the device identification of the second smart video camera.

Optionally, determining the device identification of the second smart video camera bound with the first smart video camera, based on the device identification of the first smart video camera may include: determining the identification of the second smart video camera bound with the first smart video camera from the saved device binding list, based on the device identification of the first smart video camera.

Optionally, before the device identification of the second smart video camera bound with the first smart video camera is determined based on the first smart video camera, the method further may include: receiving a device binding request sent from the first mobile terminal or the second mobile terminal where the device binding request carries the device identifications of the first smart video camera and the second smart video camera. The first mobile terminal may be the mobile terminal currently logging in to the first user account and the first user account is the user account bound with the first smart video camera. The second mobile terminal may be the mobile terminal currently logging in to the second user account, and the second user account is the user account bound with the second smart video camera. The device identifications of the first smart video camera and the second smart video camera may be saved in the device binding list respectively.

Optionally, establishing the communication between the first smart video camera and the second smart video camera based on the device identification of the second smart video camera may include: sending a communication invitation request to the second smart video camera based on the device identification of the second smart video camera; and establishing a communication between the first smart video camera and the second smart video camera when a communication acceptance response from the second smart camera is received.

Optionally, after the communication invitation request is sent to the second smart video camera based on the device identification of the second smart video camera, the method may further include: sending a communication invitation request to the second mobile terminal, when the communication acceptance response from the second smart video camera is failed to be received within a preset time; checking whether a control message sent from the second mobile terminal is received, wherein the control message is used to direct the server to control the second smart video camera to accept the communication invitation request; and controlling the second smart video camera to accept the communication invitation request when the control message is received, to establish a communication between the first smart video camera and the second smart video camera.

Optionally, after the communication invitation request is sent to the second mobile terminal, the method may further include: establishing a communication between the first smart video camera and the second mobile terminal when the communication acceptance response sent from the second mobile terminal is received.

Optionally, after the communication is established between the first smart video camera and the second mobile terminal, the method may further include: establishing a communication between the second smart video camera and the second mobile terminal.

Optionally, the method may further include: receiving the communication invitation request sent from the first mobile terminal or the second mobile terminal, the communication invitation request carries the user account which is to be invited to the current communication; and inviting the mobile terminal or the smart video camera corresponding to the user account to the current communication based on the user account carried in the communication invitation request.

In the examples of the present disclosure, on one hand, the server is able to establish a communication between the first smart video camera and the second smart video camera based on the device identification of the first smart video camera and the device identification of the second smart video camera bound with the first smart video camera. Thus, the communication between two smart video cameras can be achieved. In this way, users are no longer restricted to communication with the mobile terminal currently logging in to the user account, users may also have a direct communication with the other users via their smart video cameras. Therefore, the applicable scenario of the communication function of the smart video camera is expanded.

On the other hand, when the second smart video camera fails to accept the communication invitation request in time, the server is also allowed to control the second smart video camera to accept the communication invitation request via the control message sent from the mobile terminal currently logging in to the user account. Thus, users may be prevented from missing the communication and to bring them convenience. Moreover, the server is able to receive the communication acceptance response from the second mobile terminal while receiving the control message sent from the second mobile terminal to establish a three-party communication among the first smart video camera, the second smart video camera and the second mobile terminal. As such, the applicable scenario of the communication function of the smart video camera is further expanded.

The present disclosure may include dedicated hardware implementations such as application specific integrated circuits, programmable logic arrays and other hardware devices. The hardware implementations can be constructed to implement one or more of the methods described herein. Applications that may include the apparatus and systems of various examples can broadly include a variety of electronic and computing systems. One or more examples described herein may implement functions using two or more specific interconnected hardware modules or devices with related control and data signals that can be communicated between and through the modules, or as portions of an application-specific integrated circuit. Accordingly, the computing system disclosed may encompass software, firmware, and hardware implementations. The terms "module," "sub-module," "circuit," "sub-circuit," "circuitry," "sub-circuitry," "unit," or "sub-unit" may include memory (shared, dedicated, or group) that stores code or instructions that can be executed by one or more processors.

Other examples of the present disclosure can be available to those skilled in the art upon consideration of the specification and practice of the content disclosed herein. The application is intended to cover any variations, uses or adaptations of the present disclosure following the general principles of the present disclosure and include the common general knowledge or conventional technical means in the art without departing from the present disclosure. The specification and examples can be shown as illustrative only, and the true scope and spirit of the present disclosure are indicated by the claims.

Understandably, the present disclosure is not limited to the precise construction described above and shown in the enclosed drawings, and various modifications and changes may be made without departing from the scope thereof.

What is claimed is:

1. A method for video communication based on smart video cameras comprising:
    receiving, by a server, a communication request from a first smart video camera, wherein the communication request carries a device identification of the first smart video camera;
    receiving, by the server, a device binding request sent from a first mobile terminal or a second mobile terminal, wherein the binding request carries the device identification of the first smart video camera and a device identification of a second smart video camera;
    determining, by the server, the device identification of the second smart video camera bound with the first smart video camera using a device binding list stored in the server based on the device identification of the first smart video camera;
    sending, by the server, a communication invitation request to the second smart video camera based on the device identification of the second smart video camera; and establishing, by the server, a communication between the first smart video camera and the second smart video camera when a communication acceptance response from the second smart video camera is received; and
    sending, by the server, a communication invitation request to the second mobile terminal when the communication acceptance response from the second smart video camera is failed to be received within a preset time; and controlling, by the server, the second smart video camera to accept the communication invitation request when a control message sent from the second mobile terminal is received, and to establish the communication between the first smart video camera and the second smart video camera, wherein the control message is used to control the second smart video camera to accept the communication invitation request;

wherein the first mobile terminal is a mobile terminal currently logging in to a first user account and the first user account is a user account bound with the first smart video camera; and the second mobile terminal is a mobile terminal currently logging in to a second user account and the second user account is a user account bound with the second smart video camera.

2. The method of claim 1, before determining the device identification of the second smart video camera based on the device identification of the first smart video camera, further comprising:

saving the device identification of the first smart video camera and the device identification of the second smart video camera in the device binding list.

3. The method of claim 1, after the communication invitation request is sent to the second mobile terminal, further comprising:

establishing a communication between the first smart video camera and the second mobile terminal when the communication acceptance response sent from the second mobile terminal is received.

4. The method of claim 3, after the communication is established between the first smart video camera and the second mobile terminal, further comprising:

establishing a communication between the second smart video camera and the second mobile terminal.

5. The method of claim 1, further comprising:

receiving a communication invitation request sent from the first mobile terminal or the second mobile terminal, wherein the communication invitation request carries a user account which is to be invited to the established communication; and inviting a mobile terminal or a smart video camera corresponding to the user account to the established communication based on the user account carried in the communication invitation request.

6. A device for video communication based on smart video cameras comprising:

a processor;

a non-transitory memory storage storing instructions executed by the processor;

wherein, the processor is configured to:

receive a communication request from a first smart video camera, wherein the communication request carries a device identification of the first smart video camera;

receive a device binding request sent from a first mobile terminal or a second mobile terminal, wherein the binding request carries the device identification of the first smart video camera and a device identification of a second smart video camera;

determine the device identification of the second smart video camera bound with the first smart video camera using a device binding list stored in the device based on the device identification of the first smart video camera;

send a communication invitation request to the second smart video camera based on the device identification of the second smart video camera; and establish a communication between the first smart video camera and the second smart video camera when a communication acceptance response from the second smart video camera is received; and send a communication invitation request to the second mobile terminal when the communication acceptance response from the second smart video camera is failed to be received within a preset time; check whether a control message sent from the second mobile terminal is received, wherein the control message is used to direct the device to control the second smart video camera to accept the communication invitation request and control the second smart video camera to accept the communication invitation request when the control message is received;

wherein the first mobile terminal is a mobile terminal currently logging in to a first user account and the first user account is a user account bound with the first smart video camera; and the second mobile terminal is a mobile terminal currently logging in to a second user account and the second user account is a user account bound with the second smart video camera.

7. The device of claim 6, wherein the processor is configured to:

save the device identification of the first smart video camera and the device identification of the second smart video camera in the device binding list.

8. The device of claim 6, wherein the processor is configured to:

establish a communication between the first smart video camera and the second mobile terminal when the communication acceptance response sent from the second mobile terminal is received.

9. The device of claim 8, wherein the processor is configured to:

establish a communication between the second smart video camera and the second mobile terminal.

10. The device of claim 6, wherein the processor is configured to:

receive a communication invitation request sent from the first mobile terminal or the second mobile terminal, wherein the communication invitation request carries a user account which is to be invited to the established communication; and invite a mobile terminal or a smart video camera corresponding to the user account to the established communication based on the user account carried in the communication invitation request.

11. A non-transitory computer-readable storage medium having instructions stored therein, wherein the instructions, when executed by a processor, cause the processor to perform:

receiving a communication request sent from a first smart video camera, wherein the communication request carries a device identification of the first smart video camera;

receiving a device binding request sent from a first mobile terminal or a second mobile terminal, wherein the binding request carries the device identification of the first smart video camera and a device identification of a second smart video camera;

determining the device identification of the second smart video camera bound with the first smart video camera using a device binding list stored in a server based on the device identification of the first smart video camera;

sending a communication invitation request to the second smart video camera based on the device identification of the second smart video camera; and establishing a communication between the first smart video camera and the second smart video camera when a communication acceptance response from the second smart video camera is received; and sending a communication invitation request to the second mobile terminal when the communication acceptance response from the second smart video camera is failed to be received within a preset time; and controlling the second smart video camera to accept the communication invitation request when a control message sent from the second mobile terminal is received, and to establish the communication between the first smart video camera and the second smart video camera, wherein the control message is used to control the second smart video camera to accept the communication invitation request;

wherein the first mobile terminal is a mobile terminal currently logging in to a first user account and the first user account is a user account bound with the first smart video camera; and the second mobile terminal is a mobile terminal currently logging in to a second user account and the second user account is a user account bound with the second smart video camera.

12. The non-transitory computer-readable storage medium of claim 11, wherein the instructions further cause the processor to perform:

receiving a communication invitation request sent from the first mobile terminal or the second mobile terminal, wherein the communication invitation request carries a user account which is to be invited to the established communication; and inviting a mobile terminal or a smart video camera corresponding to the user account to the established communication based on the user account carried in the communication invitation request.

\* \* \* \* \*